United States Patent Office 3,492,795
Patented Feb. 3, 1970

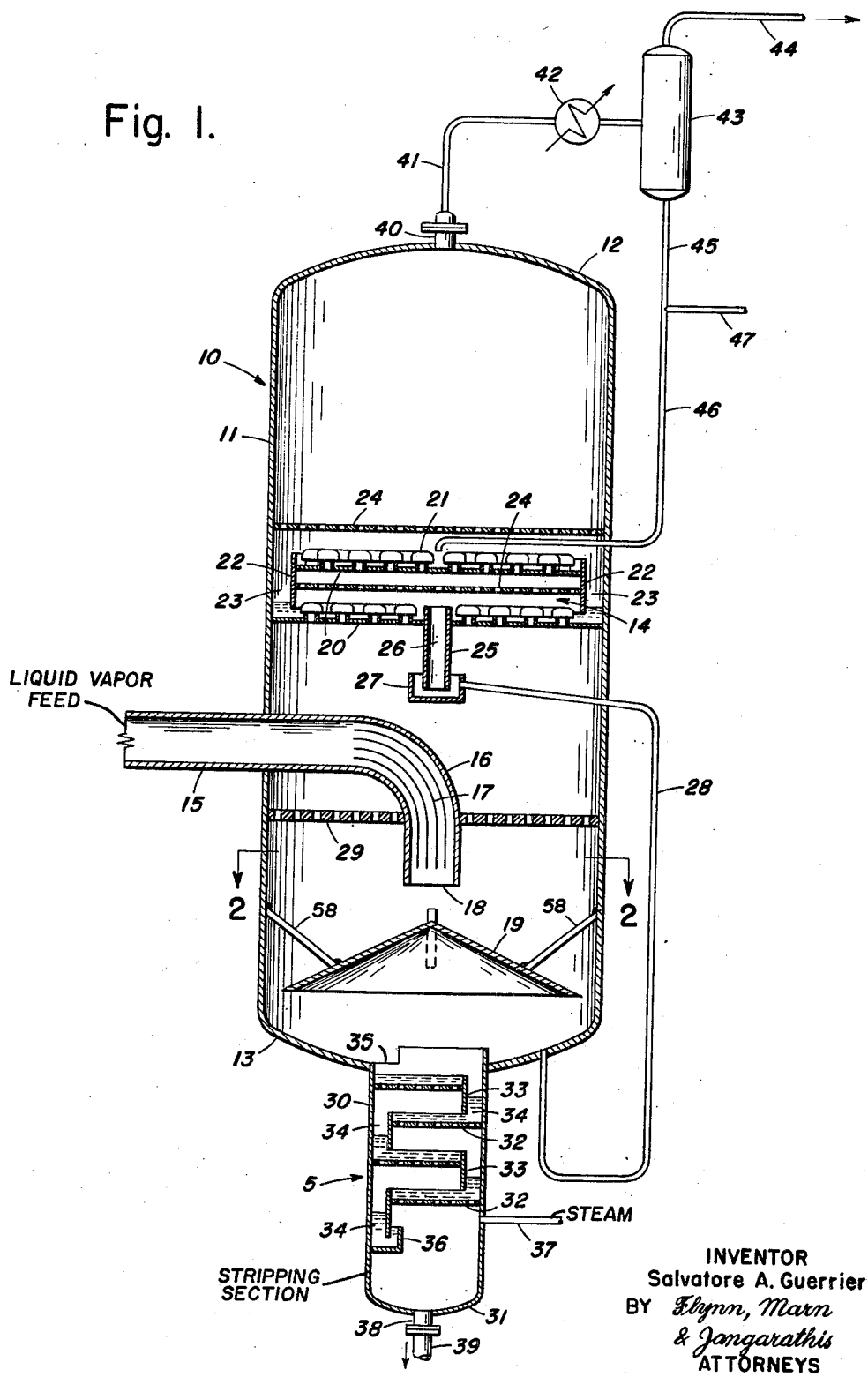

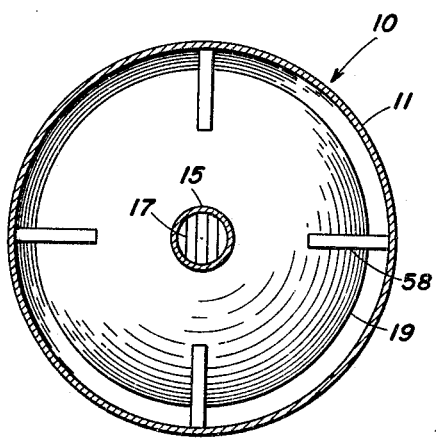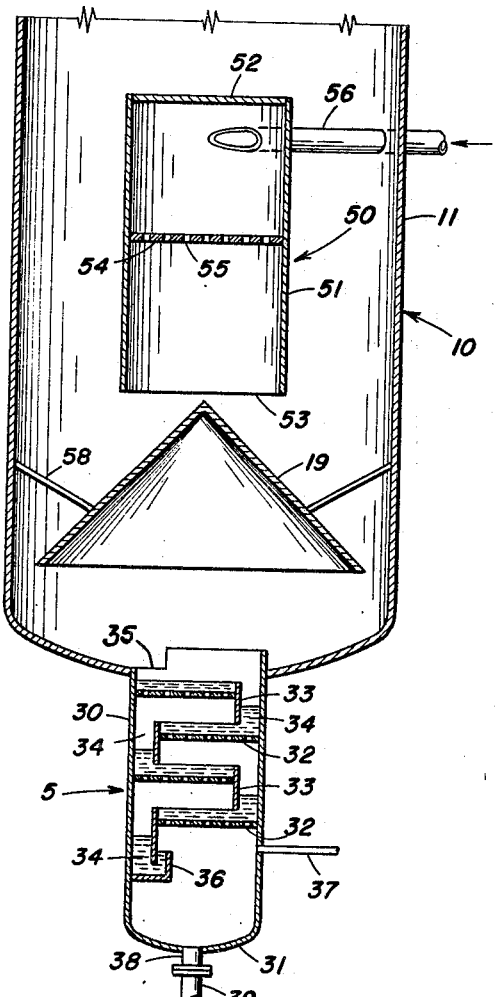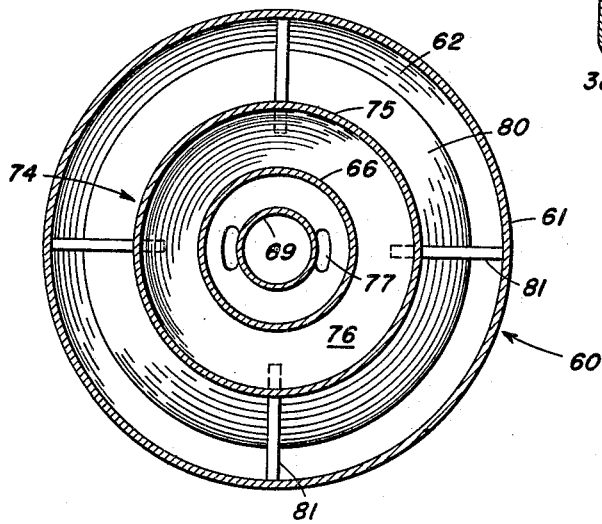

3,492,795
SEPARATION OF VAPOR FRACTION AND LIQUID FRACTION FROM VAPOR-LIQUID MIXTURE
Salvatore A. Guerrieri, Rowayton, Conn., assignor to The Lummus Company, New York, N.Y., a corporation of Delaware
Filed Aug. 6, 1965, Ser. No. 477,713
Int. Cl. B01d 45/08
U.S. Cl. 55—463         8 Claims

ABSTRACT OF THE DISCLOSURE

A vapor-liquid separating distillation tower is disclosed as being provided with a vapor-liquid feed section comprising an inlet conduit which discharges vapor-liquid mixture against a conically shaped baffle, which baffle extends across substantially the entire cross sectional area of the distillation tower. The flow of vapor liquid mixture from the inlet conduit is closely controlled so as to be axially streamlined and the flow of vapor liquid mixture across the baffle is such that the vapor fraction and liquid fraction separate with a minimum of entainment or re-entrainment.

---

In the separation of a hydrocarbon oil, such as crude petroleum or petroleum residue, the hydrocarbon oil is heated to a high temperature and introduced into a distillation tower to effect a rapid separation of vapor and liquid fraction immediately upon introduction of the feed into the unit, with temperature and pressure being selected to effect the separation. The hydrocarbon oil is generally introduced as a mixture of vapor and liquid with additional vapor being formed in the tower if the pressure there is lower than the pressure of the hydrocarbon feed line. The vapor is generally passed to a rectifying section of the unit and passed in countercurrent contact with the reflux liquid to condense the heavier components thereby vaporizing the lighter components in the reflux. The vapors withdrawn as overhead are cooled to condense at least a portion of the vapors to provide the reflux requirements of the tower.

The separated liquid, joined by reflux condensed in the lowermost tray of the rectifying section, passes through a stripping section generally comprising a series of bubble trays or other vapor-liquid contacting devices. The combined liquid is stripped of volatile constituents in the stripping section by means of superheated steam introduced below the bottom tray in the stripping section, or by reboiling the bottoms, and flows through vapor-liquid contacting devices in the stripping section countercurrent to the liquid stream. The liquid withdrawn from the bottom tray of the stripping section is removed from the fractionating tower and cooled as the residual product of the distillation. Oftentimes, steam is also introduced into the tubes of the heater, wherein the charge is preheated, to provide greater vaporization of the feed within the heater before the feed discharges into flash zone without increasing the maximum allowable temperature of the oil in the heater. In such instances, it is necessary to install larger tubes between the point of introducing the steam and the tower to avoid excessive pressure drops. Additionally, a plurality of side streams may be withdrawn as product from various trays in the rectifying section of the unit.

Many designs and arrangements have been made to approach an ideal vapor-liquid separation. For instance, one design proposes to use a transfer line which extends downwardly into the center portion of the tower. The vapor-liquid feed is caused in part to impinge upon a downwardly extending cap with the liquid passing into a pool and the vapors passing around the feed pipe and upwardly into the rectifying section of the tower At the normally high velocities of the vapor-liquid feed, the vapors are directed to a pool of liquid and pick-up liquid which is carried upwardly into the rectifying section of the tower.

Another design passes the feed through a downwardly extending transfer line and into contact with a baffle plate disposed at an angle of about 30° from the horizontal. The liquid is caused to run down and into contact with a second baffle plate disposed at an angle of about 45° from the horizontal. For certain applications, steam is introduced in a manner to impinge upon the second baffle plate at a point below that which the liquid fraction contacts the second baffle plate. The second baffle plate acts as a splash plate and causes re-entrainment of the liquid which is assisted by the steam which is directed towards the second plate in a manner to jet the liquid into the vapor space.

An object of the present invention is to provide an imporved vapor-liquid separator.

A further object of the invention is to provide an improved vapor-liquid separator whereby entrainment of liquid is minimized.

Another object of the invention is to provide an improved vapor-liquid separator which minimizes re-entrainment of the liquid after initial separations of the vapor and liquid fractions.

A still further object of the invention is to provide a means within the separator which effects streamline flow of the vapors thereby reducing turbulence.

Still another object of the invention is to provide an improved vapor-liquid separator which utilizes the forces in the feed zone to assist in effecting an efficient separation of the vapor and liquid fractions.

Further objects and advantages of the invention will be apparent from the following description taken in conjunction with the accompanying drawings in which:

FIGURE 1 is an elevational view, in section of a preferred embodiment of an entrainment separator together with a schematic flow diagram of such embodiment for fractionating a heavy hydrocarbon oil;

FIGURE 2 is a cross-sectional view of the separator of FIGURE 1 taken along the line 2–2 of FIGURE 1;

FIGURE 3 is a partial cross-sectional view of another embodiment of the invention illustrating an alternate means for introducing the feed into the separator of FIGURE 1;

FIGURE 5 is a sectional view of the separator of FIGURE 4 taken along the line 5—5 of FIGURE 4.

Figure 4:
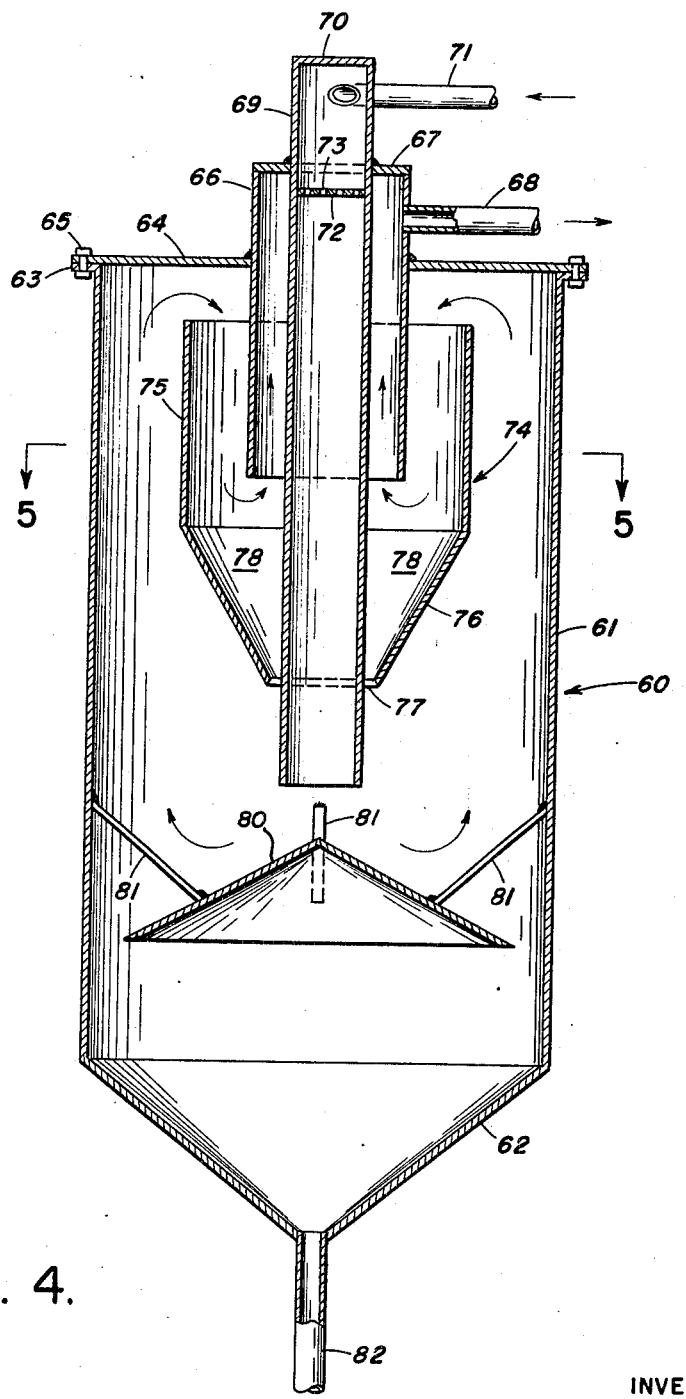
FIGURE 4 is a cross-sectional view of another embodiment of the invention.

The invention essentially relates to a means for separating a vapor fraction and a liquid fraction from a mixture containing such fractions. Accordingly, the feed is introduced into the entrainment separator through a downwardly extending transfer line with the discharge end disposed about the center line of the separator. The feed flowing from the transfer line at a high velocity is directed towards a conically-shaped baffle the apex of which points upwardly and is preferably in coaxial alignment with the center line of the discharge end of the transfer line. The base of the conically shaped baffle extends towards the walls of the separator. The vapor-liquid mixture issuing from the transfer line at a high velocity impinges on the baffle, and as a result of the velocity and force of gravity, the liquid continues to flow downwardly about the surface of the cone. The vapor however, as a result of the pressure drop in an upward direction, gradually losses its downward velocity and eventually turns upward.

Referring now to FIGURES 1 and 2, there is provided a vapor-liquid separator, generally indicated as 10, including a cylindrical chamber wall 11, and top and bottom covers 12 and 13, respectively. The principle of the invention illustrated in FIGURES 1 and 2 is shown as relating to the separation of a hydrocarbon feed, sometimes referred to as a crude oil distillation unit by those skilled in the art. The separator 10 is provided with a rectifying zone, generally indicated as 14, in the upper portion thereof and a stripping zone, generally indicated as 5, extending vertically from the bottom 13 to which the stripping zone is affixed, as by welding. A horizontal conduit 56 is disposed in the intermediate portion of the separator 10 and includes an elbow 16 extending downwardly about an angle of 90° from the horizontal. Within the elbow 16 of the conduit 56, there is provided a plurality of parallel vanes 17 to ensure smooth fluid flow of the feed through the elbow 16. It is understood that concentric vanes may also be used. Horizontally disposed within the chamber wall 11 beneath the end 18 of the conduit 56, there is provided a conically shaped baffle 19 affixed to chamber wall 11 by bars 58, as by welding. The apex of the cone of baffle 19 is pointed towards the end 18 of the conduit 56.

The base of the baffle 19 extends towards the chamber wall 11. The diameter of the base of the baffle 19 is greater than the diameter of the conduit 56, preferably from 50% to 98% of the diameter of the chamber wall 11. In a preferred form of this embodiment, the axis of the cone is in coaxial alignment with the center line of the end portion 18 of the conduit 56. The baffle 19 should be disposed in a manner to cause the total flow of vapor-liquid mixture issuing from the conduit 56 to be directed towards the baffle 19. The base of the cone may extend to a point short of the chamber wall 11. The area between the baffle 19 and the wall 11 may be determined by the pressure drop of the vapor passing between the baffle 19 and chamber wall 11. Generally, the area between the baffle 19 and chamber wall 11 should provide a pressure drop which is essentially not more than the pressure drop across a tray in the stripping section 5 of the separator 10, as more fully hereinafter described. It will be appreciated that an inverted V-shaped baffle may also be used, however, such a baffle will not be as effective as a conically shaped baffle.

The rectifying section 14 of the separator 10 is provided with horizontally disposed bubble cap trays 58, including bubble caps 21 mounted in a suitable manner. Affixed to the end portion of trays 20 are vertically disposed plates 22 which form with the chamber wall 11, downcomers 23. Only two bubble cap trays 58 are shown, however, it will be appreciated that a greater or lesser number of trays may be provided depending on the feed to be treated and the distillation results desired. Above each of the bubble cap trays 58, there is provided a wire mesh screen 24 which reduces entrainment of liquid within the upwardly flowing vapors. It is not necessary to provide screens between every pair of trays in the rectifying section. In certain instances, the wire mesh screens may be omitted altogether.

Centrally mounted to the lower bubble cap tray 58 is a vertically extending conduit 25 which is mounted in a manner to form downcomer 26 of the lower bubble cap tray 58. Beneath the lower end of the conduit 25, there is provided a seal pot 27 for collecting the liquid flowing through conduit 25. Affixed to the seal pot 27 is a conduit 28 which extends with a slight downward slope toward the chamber wall 11, through the chamber wall 11 to a point below the plane of the bottom edge of baffle 19. A plurality of straightening vanes 29 are horizontally positioned within the chamber wall 11 above the end 18 of the conduit 15 to provide for streamline flow of the vapors passing upwardly through the separator 10.

As hereinbefore mentioned, the stripping section 5 extends vertically downward and is affixed to the lower cover 13. The stripping section 5 is formed of a cylinder wall 30 and a base cover 31, and includes a plurality of sieve trays 32 suitably mounted to wall 30.

Vertically disposed and mounted to each of the sieve trays 32 are vertically extending plates 33 which form with the wall 30, downcomers 34. The cylinder wall 30 extends through the bottom cover 13 of the separator 10 with a portion 35 of the wall extending above the cover 13 being removed to permit liquid in the bottom of the separator 10 to flow down and across the top sieve tray 32 to downcomer 34 of such top tray. Mounted to the wall 30 below the plate 33 forming the lowest downcomer 34 there is provided an L-shaped plate 36 which, together with plate 33, prevents vapors from passing upwardly through the lowest downcomer 34.

A horizontally disposed conduit 37 is positioned below the bottom tray 32 of the stripping section 5 and above the liquid level in the base of the stripping section 5. The conduit 37 may be positioned below liquid level in the base of the stripping section 5, however, this may result in entrainment of a portion of the liquid in the base of the stripping section. Mounted to the base 31 of the stripping section 5 is a flange 38 which is connected to a conduit 39, through which the bottom product is withdrawn.

To the upper cover 12 of the separator 10, there is mounted a flange 40 connected to a conduit 41. The conduit 41 is in fluid communication with a heat exchanger 42 and reflux drum 43. The drum 43 is provided with overhead line 44 and condensate line 45. Line 45 is connected to lines 46 and 47, with line 46 extending into separator 10 to a point above the upper tray 58 of the rectifying section 14.

In accordance with the embodiment of the invention as illustrated in FIGURES 1 and 2, the vapor-liquid mixture is introduced through conduit 56 and is directed downwardly against baffle 19. The liquid flows downwardly along the upper surface of the baffle 19 and falls into the lower portion of the separator 10. The vapors, as a result of the forces acting thereupon, turn upwardly and pass through straightening vanes 29.

The vapors are passed through the rectifying section 14 including bubble cap trays 58, and are withdrawn through line 41. The vapors are passed through heat exchanger 42, partially or totally condensed and introduced into reflux drum 43. The uncondensed vapors are withdrawn from the drum 43 through line 44, while the condensate is withdrawn through line 45. A portion of the condensate in line 45 is passed through line 46 to the upper tray 58 of the rectifying section 14 to provide the reflux requirements for such section. The remaining portion of the condensate in line 45 is passed through line 47 to subsequent processing units (not shown). The liquid passing through the conduit 25 of the rectifying section 14 is passed through conduit 28 to the base of the separator 10 to provide a portion of the reflux requirements for the stripping section 15.

In the stripping section 5, steam or vapor is introduced through conduit 37 and is passed upwardly through the stripping section 5 including sieve trays 32 in contact with the liquid flowing across the sieve trays 32. The liquid flowing into the lowest downcomer 34 of the stripping section 5 is withdrawn through conduit 39 and passed to subsequent processing units (not shown).

In FIGURE 3, wherein like numerals indicate like parts of FIGURE 1, there is illustrated an alternate means for introducing the feed into the separator 10. In accordance with this embodiment, there is provided a feed means, generally indicated as 50, including a cylindrical wall 51 and a top cover 52 suitably mounted to chamber wall 11 (not shown). The feed means 50 is mounted above the baffle 19 within the separator 10. The axis of the cylindrical wall 51, in the preferred form, may again be in coaxial alignment with the axis of the cone of baffle 19. The lower end 53 of the cylindrical wall 51 is open and faces the apex of the baffle 19. Generally, the diameter of the cylinder 51 is about one-fourth the diameter of the separator 10.

Horizontally positioned within and mounted to the cylinder wall 51 intermediate the cover 52 and end 53, there may be provided a plate 54 including perforations 55 to ensure for better distribution of the feed onto the top surface of the baffle 19.

A horizontally disposed feed conduit 56 is affixed to the chamber wall 11 of the separator 10 and extends horizontally into the tower to a point about the upper portion of the cylinder wall 51 to which the conduit 56 is affixed in a manner to provide for fluid communication between the conduit 56 and in the interior of the cylinder wall 51. The conduit 56 is illustrated as being affixed to the cylinder wall 51 in a manner to provide for tangential flow of the feed into the interior of the cylinder wall 51. It is understood that tangential introduction of the feed is not necessary, but is preferred for more uniform distribution and smoother flow of the vapor-liquid mixture into the feed means 50.

In the embodiment of the invention as illustrated in FIGURE 3, the mixture is tangentially introduced into the inner portion of cylinder wall 51 and flows downward through perforated plate 54 against the baffle 19. The overall operation of the separator 10 is the same as that hereinbefore described with reference to FIGURES 1 and 2.

Referring to FIGURES 4 and 5, there is provided an entrainment separator, generally indicated as 60, including cylindrical wall 61 and conically shaped base 62. The upper portion of the wall 61 is provided with a flange 63 to which is affixed a cover 64, as by bolts 65. Centrally positioned and affixed to the cover 64, as by welding, there is provided a vertically disposed conduit 66, closed at the top by plate 67. In the upper portion of the conduit 66, below the plate 67, there is mounted a horizontally disposed outlet pipe 68. Within conduit 66 and in coaxial alignment therewith, there is mounted to plate 67, a conduit 69 closed at the top by plate 70. The conduit 69 extends beyond the ends of the conduit 66. In the upper portion of the conduit 69, above the plate 67 of conduit 66 and below the top plate 70, there is provided an inlet pipe 71 mounted to conduit 69 in a manner to provide for tangential introduction of the feed into the conduit 69. Horizontally positioned below the pipe 71 there is mounted within conduit 69, a plate 72 including perforations 73 to permit more uniform distribution of the feed downwardly through the conduit 69.

A vapor deflection baffle, generally indicated as 74, comprised of cylinder wall 75 and lower conically shaped bottom 76 is mounted to conduit 69 about the conduit 66 and in coaxial alignment with the conduit 66 and 69. The diameter of the cylinder wall 75 is greater than the diameter of conduit 66. The baffle 74 is positioned with the top of the cylinder wall 75 being below the cover 64 to provide for passage of vapors between the baffle 75 and the cover 64. The conically shaped bottom 76 extends towards and is mounted to the conduit 69 as by welding, at a point above the lower end of conduit 69. As seen in FIGURE 5, the bottom 76 is not affixed about the total circumferences of the conduit 69. Apertures 77 are provided near such juncture to permit the removal of liquid which may be separated within the space 78 formed by the interior surface of baffle 71 and the outer surfaces of conduits 66 and 69.

Horizontally positioned below the lower end of conduit 69 is a conically shaped baffle 80 mounted to the interior of wall 61 by suitable means, such as bracket 81. In a preferred form, the axis of the baffle 80 is in coaxial alignment with the axes of the conduit 66, conduit 69, and deflection baffle 74. The conically shaped base 62 of the separator 60 is provided with pipe means 82.

In operation of the entrainment separator 60 of FIGURES 4 and 5, the vapor-liquid mixture is passed through pipe 71 and tangentially introduced into the upper portion of conduit 69. The mixture passes downwardly through perforated plate 72 whereby substantially even distribution of the mixture is obtained onto the upper surface of the baffle 80. The liquid is caused to run down the upper surface of the baffle 80 and drops into the bottom 62 from which the liquid is withdrawn through pipe 82.

The vapors are caused to turn upwardly between the spaced formed by the interior surface of wall 61 and the outer surface of baffle 74 by the pressure drop within the separator 60. The vapors then pass over upper end of baffle 74 and into the space 78 formed by the inner surface of the baffle 74 and the outer surfaces of the conduits 66 and 69.

The vapors are then passed upwardly between the inner surface of conduit 66 and the outer surface of conduit 69 and are withdrawn through pipe 68 connected to conduit 66. Additional small quantities of the liquid are separated from the vapors during redirection of the vapors upwardly between the space formed by conduits 66 and 69. Any liquid collected in the base 76 of the baffle 74 is permitted to drop through the holes 77 onto the baffle 80. It will be appreciated that failure to provide apertures or holes 77, or alternate means of withdrawing liquid collected within baffle 74 will lessen the efficiency of the separator, since the liquid would eventually reach a level about the lower end of conduit 66 with the result that the liquid which could have been separated in zone 78 would be withdrawn with the vapors passing through pipe 68. The apparatus of FIGURES 4 and 5 may also be used in a tower by eliminating pipe 68 and plate 67.

While the invention described herein has been made with reference to a conically shaped baffle, it is to be understood that for certain applications, the baffle could be shaped to an inverted V and formed from two plates. The essential feature is that the shape and size of the baffle is selected to provide a surface larger than the cross-sectional area of the vapor-liquid mixture at the point of contact of the mixture with the baffle, and that the baffle permits the liquid to flow down the baffle in a manner to minimize re-entrainment of the liquid in the vapor at such contact. Additionally, the invention has been described in the context of walls, chambers, baffles and conduits of cylindrical shape. However, other shapes, i.e., square or rectangular, may be used without departing from the concept of my invention.

While I have described and shown preferred forms of my invention, I am aware that variations may be made thereto, and I therefore desire a broad interpretation of my invention within the scope of the disclosure herein and the following claims.

What is claimed is:

1. An apparatus for the separation of a vapor fraction and a liquid fraction from a mixture containing the same which comprises:
    (a) a vessel having side, top and bottom walls;
    (b) a first conduit means mounted within said vessel for withdrawing said vapor fraction;
    (c) a second conduit means mounted within said first conduit means and extending beyond the ends of said first conduit means for introducing said mixture;
    (d) a first baffle mounted within said vessel and spaced apart and surrounding said first conduit means, said baffle having a cylindrically shaped upper portion and a conically shaped lower portion, the lower portion of said baffle extending below the lower end of said first conduit means and being attached to the second conduit means above the lower end thereof;
    (e) a V-shaped baffle mounted within said vessel and spaced apart and below the lower end of said second conduit means, said V-shaped baffle being disposed to receive the mixture issuing from said second conduit means; and
    (f) a third conduit means to withdraw liquid from said vessel.

2. The apparatus as defined in claim 1 wherein the axis of said first conduit means, said second conduit means, said first baffle and said V-shaped baffle are in coaxial alignment.

3. The apparatus as defined in claim 1 wherein said V-shaped baffle is conical with the apex pointing toward said second conduit means.

4. The apparatus as defined in claim 1 wherein said first baffle extends towards said top wall beyond the lower end of said first conduit means.

5. The apparatus as defined in claim 1 wherein said first baffle is attached to said second conduit means in a manner to provide spaces between said baffle and said second conduit means at the point where said baffle is attached to said second conduit means.

6. The apparatus as defined in claim 1 wherein said first conduit means is mounted to said top wall, and wherein said second conduit means is mounted to said first conduit means and wherein both of said conduit means extend out of said vessel beyond said top wall.

7. An apparatus for the separation of a vapor fraction and a liquid fraction from a vapor-liquid mixture, comprising:
 (a) a vessel having side, top and bottom walls;
 (b) a first conduit means mounted within said vessel for withdrawing said vapor fraction;
 (c) a second conduit means mounted within said vessel for introducing said mixture substantially longitudinally axially of said vessel below said first conduit means said second conduit means being mounted within said first conduit means and extending beyond the end of said first conduit means;
 (d) V-shaped baffle means mounted within said vessel and spaced apart from and below the end of said second conduit means, the apex of the V-shaped baffle being positioned at the outlet portion of said second conduit means, said baffle having a cross-sectional area substantially greater than said second conduit means and extending substantially the entire area defined by the side walls of said vessel and being spaced from said side walls; and
 (e) third conduit means to withdraw said liquid fraction below said baffle means.

8. The apparatus as claimed in claim 7 wherein said first conduit means, said second conduit means, and said V-shaped baffle are in co-axial alignment.

References Cited

UNITED STATES PATENTS

| | | | |
|---|---|---|---|
| 1,442,689 | 1/1923 | Loss | 55—463 |
| 1,461,174 | 7/1923 | Bennett | 55—237 |
| 1,780,977 | 11/1930 | Leslie et al. | 196—100 X |
| 2,343,646 | 3/1944 | Dinley | 202—155 |
| 2,764,533 | 9/1956 | Oetjen et al. | 202—176 |
| 3,323,317 | 6/1967 | Van Der Ster | 62—42 |
| 2,549,388 | 4/1951 | Rivers | 202—185 X |
| 2,649,408 | 8/1953 | Williamson et al. | 202—182 X |
| 3,150,943 | 9/1964 | Darrow et al. | 55—459 X |
| 3,189,460 | 6/1965 | Smith. | |
| 1,594,296 | 7/1926 | Lee. | |
| 1,723,368 | 8/1929 | Pew, | 196—134 X |
| 1,945,581 | 2/1934 | Wallis | 196—134 X |
| 2,578,925, | 12/1951 | Davis | 202—197 X |
| 2,738,964 | 3/1956 | Binder et al. | 261—114 |
| 2,764,535 | 9/1956 | Tyskewich | 202—197 |
| 2,809,924 | 10/1957 | Middleton | 196—139 |
| 2,041,059 | 5/1936 | French. | |
| 2,779,724 | 1/1957 | Dunning et al. | 202—236 |

FOREIGN PATENTS

| | | |
|---|---|---|
| 38,235 | 2/1886 | Germany. |
| 198,921 | 1890 | France. |

NORMAN YUDKOFF, Primary Examiner

F. E. DRUMMOND, Assistant Examiner

U.S. Cl. X.R.

55—453; 196—139; 202—153, 197; 203—96